United States Patent [19]

Smith et al.

[11] Patent Number: 5,262,136
[45] Date of Patent: Nov. 16, 1993

[54] RECOVERY OF GOLD AND SILVER FROM COMPLEX REFRACTORY SULPHIDE ORES BY CYANIDISATION AND OXIDATION WITH PEROXIDES

[75] Inventors: Trevor J. Smith, Eleebana; Michelle A. Spieth, Cardiff; Stephen J. Roden, West Wallsend; Kevork A. Chouzadjian, Charlestown, all of Australia

[73] Assignee: CRA Services Limited, Melbourne, Australia

[21] Appl. No.: 778,871

[22] PCT Filed: Apr. 27, 1990

[86] PCT No.: PCT/AU90/00165

§ 371 Date: Dec. 24, 1991

§ 102(e) Date: Dec. 24, 1991

[87] PCT Pub. No.: WO90/13676

PCT Pub. Date: Nov. 15, 1990

[30] Foreign Application Priority Data

Apr. 28, 1989 [AU] Australia ............... PJ3944

[51] Int. Cl.$^5$ ............ C01G 55/00; C01G 7/00; C01G 5/00
[52] U.S. Cl. .................. 423/29; 423/22; 75/732; 75/735; 75/737
[58] Field of Search ............ 423/23, 24, 27, 29, 423/34, 35; 75/732, 735, 736, 737

[56] References Cited

U.S. PATENT DOCUMENTS

| | | | |
|---|---|---|---|
| 3,826,723 | 7/1974 | Woods et al. | 204/110 |
| 4,039,327 | 8/1977 | Dietz, Jr. et al. | 75/108 |
| 4,431,614 | 2/1984 | Makipirtti et al. | 423/29 |

FOREIGN PATENT DOCUMENTS

| | | |
|---|---|---|
| 2679788 | 7/1989 | Australia . |
| 589818 | 10/1989 | Australia . |
| 3407389 | 11/1989 | Australia . |
| 4119389 | 3/1990 | Australia . |
| 5251490 | 4/1990 | Australia . |
| 1221842 | 5/1987 | Canada . |
| 0265736 | 10/1986 | European Pat. Off. . |

OTHER PUBLICATIONS

"Comprehensive Inorganic Chemistry" Bailar et al, vol. 3 (1973) (no month avail.).

Primary Examiner—David Brunsman
Attorney, Agent, or Firm—Roylance, Abrams, Berdo & Goodman

[57] ABSTRACT

A method of recovering precious metals from a silver bearing ore containing polybasite, pearcite, pyrargyrite, tetrahedrite or argentite by mixing the ore with an alkali metal or alkaline earth metal peroxide in slurry or solid, leaching the ore with a cyanide solution, and recovering the precious metals from the cyanide solution.

7 Claims, No Drawings

RECOVERY OF GOLD AND SILVER FROM COMPLEX REFRACTORY SULPHIDE ORES BY CYANIDISATION AND OXIDATION WITH PEROXIDES

FIELD OF THE INVENTION

This invention relates to a method of improving the recovery of precious metals, from complex refractory silver-bearing ores containing such minerals as the complex silver sulphides polybasite, pearcite, and pyrargyrite, and tetrahedrite, by means of the cyanide leaching process. The invention has particular value insofar as it enables recovery of silver in addition to gold.

The invention can be incorporated into traditional cyanide leaching processes with few modifications and limited capital expenditure. Project economics can be greatly enhanced as a result of improved metal recoveries, leaching rates and reduced cyanide consumption.

BACKGROUND OF THE INVENTION

Processes for the treatment of gold/silver ores or concentrates, whose precious metal content is only partly recoverable by the traditional cyanide leaching of refractory ore, have been studied extensively. Refractory ores present particular problems in that the precious metals are trapped inside a refractory matrix. Minerals such as polybasite and tetrahedrite contain silver as well as other metals. With conventional cyanide leaching techniques, it may be uneconomical to recover the silver contained within these minerals.

Most of the known processes for use on refractory ores rely on pretreating the ore prior to cyanide leaching:

1. Roasting

This process is used on sulphide ores or concentrates and involves the heating of the material to 700° C. approximately (the temperature will vary depending upon the exact nature of the feed) to oxidise the sulphur component prior to cyanide leaching. Roasting plants are capital intensive and produce as a by-product sulphur dioxide. Further costs are usually associated with the treatment or disposal of this product.

2. Pressure Leaching

The refractory material is subjected to an acid leach at high temperature (from 150° to 220° C.) and pressure (up to 500 psi approximately). The sulphur bearing components are oxidised and are either recycled as acid back to the leach or converted to sulphates and disposed of with the tailings following cyanidation. Capital costs are very high because of the requirements for pressure autoclaves and an oxygen plant but the process avoids problems with the disposal of the removed sulphur. However, careful disposal and management of liquid effluents is necessary.

3. Biological Leaching

Biological leaching of refractory ores is relatively new and involves the use of bacteria as the oxidising agent for the sulphur content of the ore. The reactions are performed at low temperature (from 30° to 40° C.) in stirred vessels of simple construction. However, reaction rates are slow and large numbers of vessels are required, which increases capital cost. The process also generates acid, again raising the question of disposal and its associated costs.

A number of chemical additives have also been used in the treatment of precious metal concentrates or ores to increase the rate of cyanide leaching or to increase the recovery of metals. These have been used during the leaching process and not as pretreatments. The capital cost associated with the use of such additives is far lower than for those options previously described. However, their use is generally restricted to specific ore types and their effect is related to improved reaction kinetics rather than improved metal recoveries.

A number of lead-based chemicals such as lead oxides and lead nitrates are used in low concentrations (50-250 ppm) primarily to enhance gold recoveries. Although the chemicals are relatively cheap ($1,500/tonne approximately) and used in small quantities, their use is restricted to specific ore types that have sulphidic components which are soluble/partly soluble in cyanide leaching. The soluble sulphides interfere with the recovery of gold, the lead additives acting to remove them from solution by means of precipitation as lead sulphate.

Recently the use of hydrogen peroxide has been proposed by Degussa AG. The hydrogen peroxide is used to boost dissolved oxygen concentrations in solution and consequently increase the kinetics of gold extraction. Hydrogen peroxide degrades very quickly and must, therefore, be dosed continuously into the leaching system. Extreme care must be taken to monitor the level of hydrogen peroxide in solution—levels too high will catalyse the degradation of cyanide and so increase operating cost. On the other hand, levels too low will have little effect on gold extraction.

Other approaches to improve precious metal recovery have been to increase leaching residence times and increase solution cyanide concentrations. The first option has obvious adverse effects on capital costs and the second on operating costs.

In many instances, poor recoveries of silver and/or gold may be accepted because the options for increasing recoveries are not economically viable.

BRIEF SUMMARY OF THE INVENTION

Surprisingly it has been found that the use of peroxides, as defined below, in cyanide leaching of complex, refractory, silver-bearing ores, containing minerals such as polybasite, pearcite, pyrargyrite, and tetrahedrite, to increase precious metal recoveries provides significant benefits when compared to other options in terms of both operating and capital costs.

Accordingly, this invention relates to the injection of such peroxide, either in slurry or solid form, into a cyanide leaching circuit for the purpose of improving precious metal leaching kinetics and the overall recovery of precious metals from, complex, refractory, silver-bearing ores.

The term 'peroxide' as defined herein refers to peroxides of alkali and alkaline earth metals, for example, the peroxides of sodium, potassium or calcium. The invention will hereinafter be described in detail by reference to its most preferred embodiment, namely calcium peroxide, it being clearly understood that this does not limit the invention in its general aspects to this particular embodiment.

Additions of calcium peroxide may vary from 0.1 to 5.0 kg/t, more preferably from 0.1 to 2.0 kg/t, yet more preferably from 0.1 to 1.0 kg/t (calculated on the basis of 100% calcium peroxide) depending on the nature of the ore. For example, the amount used depends on whether the ore contains silver or silver and gold, or silver, gold and other precious metals, the mineralogy of the sample etc. Upper limits of calcium peroxide addition are determined by pH effects and process economics.

The contact time between the ore to be treated and the calcium peroxide may vary between 8 to 60 hours.

The calcium peroxide may be added to the ore treatment circuit at any point from the grinding to the leaching stage. Thus calcium peroxide may be introduced into the circuit at any point where standard lime addition may be made, for example, in grinding or into Merrill Crowe or into the CIP/CIL (carbon in pulp/carbon in leach) stage.

Generally speaking, the addition of calcium peroxide improves cyanide utilization. The amount of lime added to the circuit for pH control will be reduced or eliminated altogether in some cases, depending on the addition rate of calcium peroxide and the amount of free lime usually associated with commercial grades of calcium peroxide.

We have found that in the process according to the invention calcium peroxide is a much more stable compound as compared with hydrogen peroxide, releasing oxygen at a controlled rate over much longer time periods. As a result, process monitoring requirements are not as stringent as are required for hydrogen peroxide. Furthermore, reagent consumption is generally lower because of the more efficient utilisation of the available oxygen.

Calcium peroxide does not catalyse the degradation of cyanide. In fact the reduction in cyanide consumption is up to 25%, even though precious metal recoveries are increased.

In summary, the principal benefits in using calcium peroxide when compared to alternative processes are:
1. There are improvements in both leach kinetics and total metal recoveries.
2. Capital costs are minimal.
3. Addition and monitoring are simple.
4. Cyanide consumption is reduced.
5. No new effluent for treatment or disposal is produced.

The following examples serve to illustrate the invention but are not intended to limit its broad scope. In all of these examples, the calcium peroxide used contained 60% $CaO_2$ by weight.

EXAMPLE 1

A complex, refractory, silver-bearing ore containing 49 g/t silver and 2.2 g/t gold containing polybasite, pearcite, pyrargyrite, tetrahedrite and argentite, obtained from the Hidden Valley deposit in Papua New Guinea, was leached with cyanide in bottle roll experiments using the following conditions: 300 g samples, 0.1% sodium cyanide, pH=10.5, 36 hours duration and 80% passing 106 um grind size. The same ore was leached under identical conditions but with the addition of 0.75 kg/t calcium peroxide (60% $CaO_2$=0.45 kg/t 100% $CaO_2$).

Both tests were repeated ten times. The average results are presented in Table 1 below.

TABLE 1

|  | Standard Tests | $CaO_2$ Tests |
|---|---|---|
| Ag extraction (%) | 55.0 | 68.6 |
| Au extraction (%) | 92.2 | 93.1 |
| CN consumption (kg/t) | 0.36 | 0.34 |
| Separate lime addition (kg/t) | 0.16 | 0 |

EXAMPLE 2

The same ore as described in Example 1 was leached with cyanide under the following conditions: 300 g samples, 0.15% sodium cyanide, pH=10.5, 48 hours duration and 80% passing 106 μm grind size. Leaches under identical conditions, but including 1.5 kg/t calcium peroxide, were also carried out.

The results of both series of tests are presented in Table 2 below.

TABLE 2

|  | Standard Tests | $CaO_2$ Tests |
|---|---|---|
| Ag extraction (%) | 71.2 | 88.6 |
| Au extraction (%) | 92.1 | 94.0 |
| CN consumption (kg/t) | 0.61 | 0.26 |
| Separate lime addition (kg/t) | 0.16 | 0 |

EXAMPLE 3

A different sample of a complex, refractory, silver-bearing ore from the Hidden Valley deposit containing 31 g/t silver and 1.41 g/t gold was leached with cyanide in bottle roll experiments as follows: 600 g samples, 0.1% NaCN, pH=10.5, 36 hour duration and 80% passing 106 μm grind size. Liquor and solid samples were taken at 12, 24 and 36 hours and compared to samples taken from experiments performed under identical conditions but including 1.5 g/t calcium peroxide.

The results are shown below in Table 3.

TABLE 3

|  | Standard Tests % Ag ext (residue g/t) | $CaO_2$ Tests % Ag ext (residue g/t) |
|---|---|---|
| 12 hour sample | 46.7 (17.0) | 53.3 (16.0) |
| 24 hour sample | 59.0 (12.35) | 67.7 (10.55) |
| 36 hour sample | 66.0 (11.40) | 75.2 (8.15) |

EXAMPLE 4

An ore as described in Example 3 was treated in a standard cyanidation leach, a leach including 1.5 kg/t calcium peroxide and a third leach including 0.45 kg/t hydrogen peroxide for comparison.

The results are shown below in Table 4.

TABLE 4

|  | Standard Test | $CaO_2$ Test | $H_2O_2$ Test |
|---|---|---|---|
| Ag extraction (%) | 70.3 | 75.9 | 70.2 |
| Au extraction (%) | 88.9 | 88.7 | 86.8 |
| CN consumption (kg/t) | 0.28 | 0.20 | 0.34 |
| Separate lime addition (kg/t) | 0.35 | 0 | 0.42 |

EXAMPLE 5

A complex, refractory, silver-bearing ore containing 49 g/t silver and 2.2 g/t gold was leached in bottle roll experiments using the following conditions: 300 g samples, 0.1% sodium cyanide, pH=10.5, 36 hours duration and 80% passing 106 um grind size.

The same ore was leached under identical conditions but with the addition of 1.5 kg/t calcium peroxide (60% $CaO_2$=0.9 kg/t 100% $CaO_2$).

The residue from these two leaches then underwent a detailed mineralogical examination to ascertain the effect leaching conditions had on silver mineralogy. The results of this examination are presented in Table 5.

TABLE 5

| Mineral | % Remaining After Extraction | |
|---|---|---|
| | Cyanide Leach | Cyanide & Calcium peroxide Leach |
| Tetrahedrite | 60 | 60 |
| Polybasite Pearcite Pyrargyrite | 45 | 15 |
| Argentite | 10.0 | 6.2 |

EXAMPLE 6

The procedure described in Example 5 was repeated on an ore containing 1.41 g/t gold and 31 g/t silver. Results are presented in Table 6.

TABLE 6

| Mineral | % Remaining After Extraction | |
|---|---|---|
| | Cyanide Leach | Cyanide + $CaO_2$ |
| Tetrahedrite | 32.3 | 7.4 |
| Polybasite Pearcite Pyrargryite | 13.2 | 0.6 |
| Argentite | 0 | 0 |

It will be clearly understood that the invention in its general aspects is not limited to the specific details referred to hereinabove.

We claim:

1. A method of recovering precious metals from complex, refractory, silver-bearing ore containing at least one compound selected from the group consisting of polybasite, pearcite, pyrargyrite, tetrahedrite and argentite, the method comprising the steps of:

mixing said ore with an alkali metal or alkaline earth metal peroxide in slurry or solid in an amount from 0.1 to 5.0 kg/t of ore, calculated on the basis of 100% peroxide, leaching said ore with a cyanide solution, and recovering said precious metals from said cyanide solution.

2. A method as claimed in claim 1, wherein the peroxide used is calcium peroxide.

3. A method as claimed in claim 2, wherein the amount of calcium peroxide used is from 0.1 to 2.00 kg/t of ore.

4. A method as claimed in claim 3, wherein the amount of calcium peroxide used is from 0.1 to 1.00 kg/t of ore.

5. A method as claimed in claim 1, wherein the amount of alkali or alkaline earth metal peroxide used is from 0.1 to 2.00 kg/t of ore.

6. A method as claimed in claim 5, wherein the amount of alkali or alkaline earth metal peroxide used is from 0.1 to 1.00 kg/t of ore.

7. The method of claim 1, wherein said peroxide is an alkaline earth metal peroxide.

* * * * *